US011803855B2

(12) United States Patent
Liu et al.

(10) Patent No.: US 11,803,855 B2
(45) Date of Patent: Oct. 31, 2023

(54) METHOD FOR DETECTING BLOCK CHAIN ABNORMAL BEHAVIOR BASED ON GRAPH EMBEDDING

(71) Applicant: Yantai University, Yantai (CN)

(72) Inventors: Zhaowei Liu, Yantai (CN); Yingjie Wang, Yantai (CN); Peiyong Duan, Yantai (CN); Haiyang Wang, Yantai (CN); Yongchao Song, Yantai (CN)

(73) Assignee: Yantai University, Yantai (CN)

( * ) Notice: Subject to any disclaimer, the term of this patent is extended or adjusted under 35 U.S.C. 154(b) by 0 days.

(21) Appl. No.: 18/180,676

(22) Filed: Mar. 8, 2023

(65) Prior Publication Data

US 2023/0289807 A1   Sep. 14, 2023

(51) Int. Cl.
*G06Q 20/40* (2012.01)
*G06Q 20/38* (2012.01)
*G06F 18/2323* (2023.01)

(52) U.S. Cl.
CPC ..... *G06Q 20/4016* (2013.01); *G06F 18/2323* (2023.01); *G06Q 20/389* (2013.01)

(58) Field of Classification Search
CPC .............. G06Q 20/4016; G06Q 20/389; G06F 18/2323
See application file for complete search history.

(56) References Cited

U.S. PATENT DOCUMENTS

2019/0392489 A1\* 12/2019 Tietzen ................ G06Q 20/065

FOREIGN PATENT DOCUMENTS

| CN | 111667267 A | 9/2020 |
|---|---|---|
| CN | 113283909 A | 8/2021 |
| CN | 113506179 A | 10/2021 |
| CN | 113537806 A | 10/2021 |
| CN | 113723954 A | 11/2021 |

\* cited by examiner

*Primary Examiner* — Truong V Vo
(74) *Attorney, Agent, or Firm* — LBGovernment

(57) ABSTRACT

Disclosed is a method for detecting a block chain abnormal behavior based on graph embedding. The method comprises S100: data collection: acquiring public block chain abnormal behavior node data on the Internet, and acquiring normal nodes in a number equal to that of abnormal behavior nodes at the same time; S200: establishment of abnormal behavior recognition model: extracting features of all nodes, constructing the nodes subjected to feature extraction into a transaction graph, and forming the abnormal behavior recognition model based on a graph embedding technology according to the constructed transaction graph; and S300: transaction detection: determining a transaction risk according to the obtained abnormal behavior recognition model when a transaction occurs, and prompting a user of a risk level. According to the method for detecting the block chain abnormal behavior based on graph embedding, abnormal behaviors possibly existing in block chain transactions can be effectively detected and early warned.

4 Claims, 1 Drawing Sheet

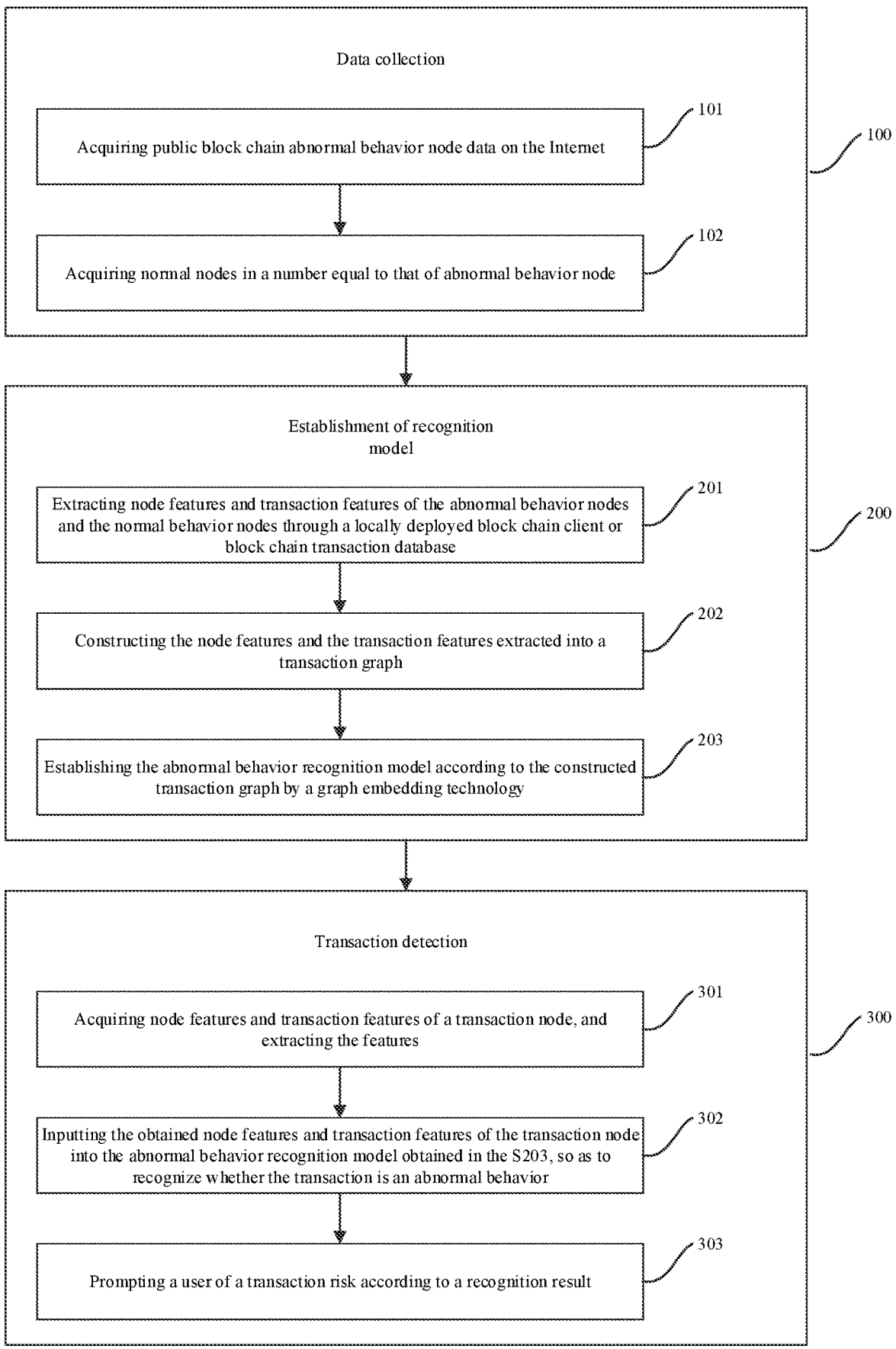

METHOD FOR DETECTING BLOCK CHAIN ABNORMAL BEHAVIOR BASED ON GRAPH EMBEDDING

CROSS REFERENCE TO RELATED APPLICATIONS

This application claims foreign priority of Chinese Patent Application No. 202210229160.8, filed on Mar. 9, 2022 in the China National Intellectual Property Administration, the disclosures of all of which are hereby incorporated by reference.

TECHNICAL FIELD

The present invention relates to the field of block chain networks, and particularly to a method for detecting a block chain abnormal behavior.

BACKGROUND OF THE PRESENT INVENTION

With the continuous development of block chain technology, an era of block chain is coming. The block chain technology brings many opportunities for the social governance of government, the development of judicial practice and the social governance in the field of people's livelihood. The block chain technology has been widely used in the field of social governance, but the technology also brings many challenges. At the present stage, there are more and more crimes utilizing the block chain technology, and illegal and abnormal behaviors such as phishing, Ponzi scheme, money laundering and terrorist financing emerge one after another. Existing methods for detecting block chain abnormal behaviors mainly detect a single abnormal behavior of an Ethereum platform in a block chain (such as phishing, Ponzi scheme, money laundering and terrorist financing) through manual labeling or code analysis. If all possible abnormal behaviors are detected by relying on the above method for detecting the single abnormal behavior, not only a large amount of data required by different methods need to be collected, but also various detection methods need to be integrated, thus increasing the complexity of the detection method, reducing the stability of a detection system constructed by the above method, spending a lot of time due to a barrel effect, and increasing the running burden of a detection server. Therefore, there is an urgent need for a simple, stable and efficient method for detecting a block chain abnormal behavior.

SUMMARY OF PRESENT INVENTION

The present invention mainly aims to provide a method for detecting a block chain abnormal behavior based on graph embedding, so as to overcome the defects and deficiencies in the prior art.

The technical solution of the present invention is as follows.

A method for detecting a block chain abnormal behavior based on graph embedding is characterized in that, the method comprises:

S100: data collection: acquiring public block chain abnormal behavior nodes on the Internet, and acquiring normal nodes in a number equal to that of the abnormal behavior nodes at the same time;

S200: establishment of abnormal behavior recognition model: extracting node features and transaction features of the abnormal behavior nodes and the normal behavior nodes in the S100, constructing all nodes subjected to feature extraction into a transaction graph, and establishing the abnormal behavior recognition model based on a graph embedding technology according to the constructed transaction graph; and S300: transaction detection: determining a transaction risk when a transaction occurs by utilizing the abnormal behavior recognition model, and prompting a user of a risk level.

Preferably, the S100 specifically comprises:

S101: mainly acquiring the abnormal behavior nodes from an open source database, such as EtherScamDB and Etherscan; and S102: acquiring the normal nodes in the number equal to that of the abnormal behavior nodes through a locally deployed block chain client or block chain transaction database, wherein the normal nodes are incapable of being marked as the abnormal behavior nodes by any database.

Preferably, the S200 specifically comprises:

S201: extracting the node features and the transaction features of the abnormal behavior nodes and the normal behavior nodes through the locally deployed block chain client or block chain transaction database; wherein the node features comprise, but are not limited to: a node balance, a minimum amount received by the node, a time stamp difference between a first transaction and a last transaction, a number of transactions and a number of contracts created; and the transaction features comprise, but are not limited to: a sender and a receiver of a transaction, a block height, a transaction amount, a called contract type and a transaction type;

S202: constructing the node features and the transaction features extracted in the S201 into the transaction graph; wherein:

the transaction graph may be expressed as G=(V, E), wherein V is a set of nodes and E is a set of edges;

preferably, the V is the set of nodes and used for storing the node features extracted in the S201, and each node may be expressed as a quadruple, which is namely V={v,d,b,m}, wherein v represents the node, d represents the time stamp difference between the first transaction and the last transaction, b represents an account balance, and m represents a minimum amount received;

preferably, the E is the set of edges and used for storing the transaction features extracted in the S201, and each edge may be expressed as a quintuple, which is namely E={($v_i$, $v_j$,w,t,r)|$v_i$,$v_j \in$V, w$\in R^+$,t $\in$Z, r$\in$R}, wherein ($v_i$, $v_j$) represents a transaction from $v_i$ to $v_j$, w represents the transaction amount, t represents the block height of the transaction, and r represents the transaction type; and the above V and E are a recommended construction method with comprehensive consideration of performance and recognition accuracy, which may be flexibly adjusted according to the data obtained after feature extraction; and S203: establishing the abnormal behavior recognition model according to the constructed transaction graph by the graph embedding technology; wherein:

preferably, the abnormal behavior recognition model is a block chain behavior recognition model formed by embedding for multiple times according to an attribute network embedding method based on biased random walk in graph embedding, and the recognition model mainly considers three biased random walk methods: a random walk strategy based on the transaction amount, a random walk strategy based on the block height and a random walk strategy based on the transaction type.

Referring to Node2Vec and other algorithms, a relationship between anode and a surrounding node is obtained based on the transaction features by using the above random walk strategies, and a node embedding vector is obtained by solving according to a Skip-gram model. A final node embedding vector is obtained by adding the obtained node embedding vector with the node features.

Preferably, according to the random walk strategy based on the transaction amount, a transition probability from anode u to a neighboring node $\chi \epsilon V_u$ is:

$$P_{A_{ux}} = \frac{\text{Max } A(u, x)}{\sum_{k' \in V_u} \text{Sum} A(u, x')}$$

wherein MaxA (u, x) refers to a maximum transaction amount between the node u and a node x, and $\Sigma x' \epsilon V_u \text{Sum} A$ (u,x') refers to a sum of transaction amounts between the node u and all nodes on which a transaction occurs with the node u;

Preferably, according to the random walk strategy based on the block height, the transition probability from the node u to the neighboring node $\chi \epsilon V_u$ is:

$$P_{T_{ux}} = \frac{\text{Max } T(u, x)}{\sum_{k' \in V_u} \text{Sum} T(u, x')}$$

wherein MaxT (u, x) refers to a maximum block height between the node u and the node x when a transaction occurs, and $\Sigma x' \epsilon V_u \text{Sum} T(u,x')$ refers to a sum of block heights between the node u and all nodes on which a transaction occurs with the node u.

Preferably, according to the random walk strategy based on the transaction type, the transition probability from the node u to the neighboring node $\chi \epsilon V_u$ is:

$$P_{E_{ux}} = \frac{\text{Max } E(u, x)}{\sum_{k' \in V_u} \text{Sum} E(u, x')}$$

wherein MaxE (u, x) refers to a most frequent transaction type between the node u and the node x, and $\Sigma x' \epsilon V_u \text{Sum} E$ (u,x')refers to a sum of transaction types between the node u and all nodes on which a transaction occurs with the node u.

Preferably, in order to give consideration to the embedding for multiple times according to the attribute network embedding method based on biased random walk, super-parameters may be used to balance an influence of the embedding for multiple times, and the super-parameters are adjusted by an automatic parameter adjustment algorithm, such as Auto ML, so as to finally obtain the abnormal behavior recognition model.

Preferably, the S300 specifically comprises:

S301: before a transaction behavior occurs, acquiring the node features and the transaction features according to the methods in the S201 and the S202, and extracting the features;

S302: inputting the obtained node features and transaction features of the transaction node into the abnormal behavior recognition model obtained in the S203, so as to recognize whether the transaction is an abnormal behavior; and S303: prompting the user of the transaction risk according to a recognition result.

According to the method for detecting the block chain abnormal behavior based on graph embedding of the present invention, abnormal behaviors possibly existing in block chain transactions can be effectively detected and early warned. On one hand, the abnormal behavior nodes in the block chain are collected through a public data set for all-round feature extraction, rich data comprising node information and transaction information are obtained, and compared with an existing traditional method for recognition by only collecting the node information or the transaction information, according to the method, the abnormal behavior recognition model obtained in the later stage has a higher recognition accuracy and is closer to a real situation. In addition, compared with an existing detection method, the method of the present invention pays more attention to detection of a transaction behavior in the later stage and is not limited to construction of a detection model, and meanwhile, the method pays more attention to the detection and prompt of the transaction behavior after the model is established.

DESCRIPTION OF THE DRAWINGS

FIG. 1 is a flow chart of a method for detecting a block chain abnormal behavior based on graph embedding according to the present invention.

DETAILED DESCRIPTION OF PREFERRED EMBODIMENTS

In order to make the objectives, technical solutions, and advantages of embodiments of the present invention clearer, the technical solution in the embodiments of the present invention will be described clearly and completely hereinafter with reference to the drawings in the embodiments of the present invention. Obviously, the described embodiments are some, but not all, embodiments of the present invention. Based on the embodiments in the present invention, all other embodiments obtained by those of ordinary skills in the art without going through any creative work should fall within the scope of protection of the present invention.

The technical solution of the present invention is further described hereinafter with reference to the drawings and the embodiments.

Embodiment

As shown in FIG. 1, a method for detecting a block chain abnormal behavior based on graph embedding comprises:

S100: data collection: acquiring public block chain abnormal behavior nodes on the Internet, and acquiring normal nodes in a number equal to that of the abnormal behavior nodes at the same time;

S200: establishment of abnormal behavior recognition model: extracting node features and transaction features of the abnormal behavior nodes and the normal behavior nodes in the S100, constructing all nodes subjected to feature extraction into a transaction graph, and establishing the abnormal behavior recognition model based on a graph embedding technology according to the constructed transaction graph; and S300: transaction detection: determining a transaction risk when a transaction occurs by utilizing the abnormal behavior recognition model, and prompting a user of a risk level.

The S100 specifically comprises the following steps.

In S101, the abnormal behavior nodes are mainly acquired from an open source database, such as EtherScamDB and Etherscan, and are stored according to a self-accustomed data storage method through a data acquisition method provided by the above database.

Preferably, when the abnormal behavior nodes are extracted, nodes simultaneously existing in two or more databases are usually recognized as the abnormal behavior nodes.

In S102, the normal nodes in the number equal to that of the abnormal behavior nodes are acquired through a locally deployed block chain client or block chain transaction database. The normal nodes are incapable of being marked as the abnormal behavior nodes by any database. Meanwhile, random selection should be realized when the normal nodes are selected, and heights of blocks should be evenly distributed.

Preferably, for a block chain platform on which an external account and a contract account are distinguished, such as Ethereum, a ratio of the external account to the contract account in the abnormal behavior nodes obtained in the S101 should be similar to that in the normal nodes when the normal nodes are selected. It is preferably able to filter a large number of accounts viewing airdrop information, thus reducing a recognition pressure of the abnormal behavior recognition model.

The S200 specifically comprises the following steps.

In S201, the node features and the transaction features of the abnormal behavior nodes and the normal behavior nodes are extracted through the locally deployed block chain client or block chain transaction database.

Preferably, the node features comprise, but are not limited to: a node balance, a minimum amount received by the node, a time stamp difference between a first transaction and a last transaction, a number of transactions and a number of contracts created. The transaction features comprise, but are not limited to: a sender and a receiver of a transaction, a block height, a transaction amount, a called contract type and a transaction type.

In S202, the node features and the transaction features extracted in the S201 are constructed into the transaction graph.

The transaction graph may be expressed as G=(V, E), wherein V is a set of nodes and E is a set of edges.

Preferably, the V is the set of nodes and used for storing the node features extracted in the S201, and each node may be expressed as a quadruple, which is namely V={v,d,b,m}, wherein v represents the node, d represents the time stamp difference between the first transaction and the last transaction, b represents an account balance, and m represents a minimum amount received.

Preferably, the E is the set of edges and used for storing the transaction features extracted in the S201, and each edge may be expressed as a quintuple, which is namely E={($v_i$, $v_j$,w,t,r)|$v_i$,$v_j$ ∈V, w∈$R^+$,t∈Z,r∈R}, wherein ($v_i$, $v_j$) represents a transaction from $v_i$ to $v_j$, w represents the transaction amount, t represents the block height of the transaction, and r represents the transaction type.

The above V and E are a recommended construction method with comprehensive consideration of performance and recognition accuracy, which may be flexibly adjusted according to the data obtained after feature extraction.

In S203, the abnormal behavior recognition model is established according to the constructed transaction graph by the graph embedding technology.

Preferably, the abnormal behavior recognition model is a block chain behavior recognition model formed by embedding for multiple times according to an attribute network embedding method based on biased random walk in graph embedding, and the recognition model mainly considers three biased random walk methods : a random walk strategy based on the transaction amount, a random walk strategy based on the block height and a random walk strategy based on the transaction type.

Referring to Node2Vec and other algorithms, a relationship between anode and a surrounding node is obtained based on the transaction features by using the above random walk strategies, and a node embedding vector is obtained by solving according to a Skip-gram model. A final node embedding vector is obtained by adding the obtained node embedding vector with the node features.

The consideration of the random walk strategy based on the transaction amount is mainly because a larger transaction amount means that a relationship between two nodes is closer, and under biased sampling based on the transaction amount, a transition probability from a node u to a neighboring node χ∈$V_u$ is:

$$P_{A_{ux}} = \frac{\text{Max } A(u, x)}{\sum_{x' \in V_u} SumA(u, x')}$$

wherein MaxA(u, x) refers to a maximum transaction amount between the node u and a node x, and $\Sigma_{x' \in V_u} SumA(u,x')$ refers to a sum of transaction amounts between the node u and all nodes on which a transaction occurs with the node u.

The consideration of the random walk strategy based on the block height is mainly because each edge has one block height, the greater the block height is, the greater the influence on a current relationship of nodes is, and under biased sampling based on time, the transition probability from the node u to the neighboring node χ∈$V_u$ is:

$$P_{T_{ux}} = \frac{\text{Max } T(u, x)}{\sum_{x' \in V_u} SumT(u, x')}$$

wherein MaxT (u, x) refers to a maximum block height between the node u and the node x when a transaction occurs, and $\Sigma_{x' \in V_u} SumT(u,x')$ refers to a sum of block heights between the node u and all nodes on which a transaction occurs with the node u.

The consideration of the random walk strategy based on the transaction type is mainly because there are many types of transactions in the block chain, researches show that a smart contract is called in most common account transaction types on a transaction platform supporting the smart contract, such as Ethereum, different weights are set for different transaction types, and under biased sampling based on the transaction type, the transition probability from the node u to the neighboring node χ∈$V_u$ is:

$$P_{E_{ux}} = \frac{\text{Max } E(u, x)}{\sum_{x' \in V_u} SumE(u, x')}$$

wherein MaxE (u, x) refers to a most frequent transaction type between the node u and the node x, and $\Sigma x' \epsilon V_u \text{SumE}$ (u,x') refers to a sum of transaction types between the node u and all nodes on which a transaction occurs with the node u.

Preferably, for a block chain platform with only one transaction type of transfer, which does not support the smart contract and other functions and is represented by "bitcoin" in the block chain, the weights may be set as a uniform value. For a platform supporting the smart contract and other functions and represented by "Ethereum" in the block chain, weights of transaction types, such as transfer, contract creation and contract call, may be set as 1, 2 and 3 respectively.

Preferably, in order to give consideration to the embedding for multiple times according to the attribute network embedding method based on biased random walk, super-parameters may be used to balance an influence of the embedding for multiple times, and the super-parameters are adjusted by an automatic parameter adjustment algorithm, such as Auto ML, so as to finally obtain the abnormal behavior recognition model.

Preferably, the S300 specifically comprises the following steps.

In S301, before a transaction behavior occurs, the node features and the transaction features are acquired according to the methods in the S201 and the S202, and the features are extracted.

In S302, the obtained node features and transaction features of the transaction node are input into the abnormal behavior recognition model obtained in the S203, so as to recognize whether the transaction is an abnormal behavior.

In S303, the user is prompted of the transaction risk according to a recognition result.

The above are only the preferred embodiments of the present invention and are not intended to limit the present invention. For those skilled in the art, the present invention may have various modifications and changes. Any modification, equivalent substitution, improvement, etc. made within the spirit and principle of the present invention are included in the scope of protection of the present invention.

We claim:

1. A method for detecting a block chain abnormal behavior based on graph embedding, wherein the method comprises:

S100: data collection: acquiring public block chain abnormal behavior nodes on the Internet, and acquiring normal nodes in a number equal to that of the abnormal behavior nodes at the same time;

S200: establishment of abnormal behavior recognition model: extracting node features and transaction features of the abnormal behavior nodes and the normal behavior nodes in the S100, constructing all nodes subjected to feature extraction into a transaction graph, and establishing the abnormal behavior recognition model based on a graph embedding technology according to the constructed transaction graph; and S300: transaction detection: determining a transaction risk when a transaction occurs by utilizing the abnormal behavior recognition model, and prompting a user of a risk level;

the S100 comprises:

S101: acquiring the abnormal behavior nodes from an open source database; and

S102: acquiring the normal nodes in the number equal to that of the abnormal behavior nodes through a locally deployed block chain client or block chain transaction database, wherein the normal nodes are incapable of being marked as the abnormal behavior nodes by any database;

the S200 comprises:

S201: extracting the node features and the transaction features of the abnormal behavior nodes and the normal behavior nodes through the locally deployed block chain client or block chain transaction database; wherein:

the node features comprise, but are not limited to: a node balance, a minimum amount received by the node, a time stamp difference between a first transaction and a last transaction, a number of transactions and a number of contracts created; and the transaction features comprise, but are not limited to: a sender and a receiver of a transaction, a block height, a transaction amount, a called contract type and a transaction type;

S202: constructing the node features and the transaction features extracted in the S201 into the transaction graph; wherein:

the transaction graph is expressed as G=(V, E), wherein V is a set of nodes and E is a set of edges;

the V is the set of nodes and used for storing the node features extracted in the S201, and each node is expressed as a quadruple, which is namely V={v,d,b,m}, wherein v represents the node, d represents the time stamp difference between the first transaction and the last transaction, b represents an account balance, and m represents a minimum amount received; and the E is the set of edges and used for storing the transaction features extracted in the S201, and each edge is expressed as a quintuple, which is namely E={$(v_i,v_j,w,t,r)|v_i,v_j \epsilon V, w \epsilon R^+, t \epsilon Z, r \epsilon R$}, wherein ($v_i$, $v_j$) represents a transaction from $v_i$ to $v_j$, w represents the transaction amount, t represents the block height of the transaction, and r represents the transaction type; and S203: establishing the abnormal behavior recognition model according to the constructed transaction graph by the graph embedding technology; wherein:

the abnormal behavior recognition model is a block chain behavior recognition model formed by embedding for multiple times according to an attribute network embedding method based on biased random walk in graph embedding.

2. The method for detecting the block chain abnormal behavior based on graph embedding according to claim 1, wherein:

the recognition model mainly considers three biased random walk methods: a random walk strategy based on the transaction amount, a random walk strategy based on the block height and a random walk strategy based on the transaction type;

according to the random walk strategy based on the transaction amount, a transition probability from a node u to a neighboring node $\chi \epsilon V_u$ is:

$$P_{A_{ux}} = \frac{\text{Max } A(u, x)}{\sum_{x' \epsilon V_u} \text{Sum} A(u, x')}$$

wherein MaxA(u, x) refers to a maximum transaction amount between the node u and a node x, and $\Sigma x' \epsilon V_u \text{SumA}(u,x')$ refers to a sum of transaction amounts between the node u and all nodes on which a transaction occurs with the node u;

according to the random walk strategy based on the block height, the transition probability from the node u to the neighboring node $\chi \epsilon V_u$ is:

$$P_{T_{ux}} = \frac{\text{Max } T(u, x)}{\sum_{x' \in V_u} \text{Sum} T(u, x')}$$

wherein MaxT(u, x) refers to a maximum block height between the node u and the node x when a transaction occurs, $\Sigma x' \epsilon V_u \text{Sum} T(e,x')$ refers to a sum of block heights between the node u and all nodes on which a transaction occurs with the node u; and according to the random walk strategy based on the transaction type, the transition probability from the node u to the neighboring node $\chi \epsilon V_u$ is:

$$P_{E_{ux}} = \frac{\text{Max } E(u, x)}{\sum_{x' \in V_u} \text{Sum} E(u, x')}$$

wherein MaxE(u, x) refers to a most frequent transaction type between the node u and the node x, and $\Sigma x' \epsilon V_u \text{Sum} E(u,x')$ refers to a sum of transaction types between the node u and all nodes on which a transaction occurs with the node u.

3. The method for detecting the block chain abnormal behavior based on graph embedding according to claim 2, wherein:

in order to give consideration to the embedding for multiple times according to the attribute network embedding method based on biased random walk, super-parameters are used to balance an influence of the embedding for multiple times, and the super-parameters are adjusted by an automatic parameter adjustment algorithm, so as to finally obtain the abnormal behavior recognition model.

4. The method for detecting the block chain abnormal behavior based on graph embedding according to claim 1, wherein:

the S300 specifically comprises:

S301: before a transaction behavior occurs, acquiring the node features and the transaction features according to the methods in the S201 and the S202, and extracting the features;

S302: inputting the obtained node features and transaction features of the transaction node into the abnormal behavior recognition model obtained in the S203, so as to recognize whether the transaction is an abnormal behavior; and S303: prompting the user of the transaction risk according to a recognition result.

* * * * *